March 17, 1970      J. COLEMAN      3,500,492

TRASH DISPOSAL SYSTEM FOR AUTOMOBILES

Original Filed March 17, 1967

INVENTOR
Joe Coleman
BY Curtis, Morris & Safford
ATTORNEYS

United States Patent Office 3,500,492
Patented Mar. 17, 1970

3,500,492
TRASH DISPOSAL SYSTEM FOR AUTOMOBILES
Joe Coleman, Rte. 2, Grand Bay, Ala. 36541
Continuation of application Ser. No. 624,095, Mar. 17, 1967. This application Nov. 4, 1968, Ser. No. 774,582
Int. Cl. B60s 1/64
U.S. Cl. 15—313           6 Claims

ABSTRACT OF THE DISCLOSURE

A refuse disposal system for automobiles having a collection box under the automobile hood connected through tubes to various refuse-receiving units. A fan or blower exhausts air from the collection box and is operated by switches at the various refuse-receiving units.

---

This application is a continuation of Ser. No. 624,095, and now abandoned.

A problem often encountered by motorists is the tendency for trash and dirt to accumulate in the interior of their automobiles. Because automobiles lack suitable means for disposing of paper trash, objects such as wadded candy wrappers, used paper handkerchiefs and empty cigarette packs are frequently permitted to litter the interior of the vehicle. The common expedient of throwing such trash from the windows of the car upon the highway and the surrounding countryside can scarcely be regarded as a desirable solution to the problem. In addition to paper trash, automobile interiors are also frequently soiled by small particles of dust, cigarette ashes, dirt and sand, which are removed only with considerable difficulty.

An object of this invention is to provide a convenient and satisfactory means by which the passengers in a motor vehicle can dispose of small articles of trash. A further object of the invention is to provide a simple means for removing granular dirt, dust and similar substances from the floor and the interior surfaces of the vehicle. These and other objects will be in part obvious and in part pointed out below.

In general, the above objectives are achieved in accordance with the invention by a pneumatic vacuum system having a plurality of intake stations positioned within the automobile, into which trash may be placed or into which a flexible hose can be inserted to provide a device for cleaning the auto interior. Objects entering any of the stations of the system are drawn through tubes by a vacuum fan and deposited in a trash disposal box which is periodically emptied.

Figure 1:
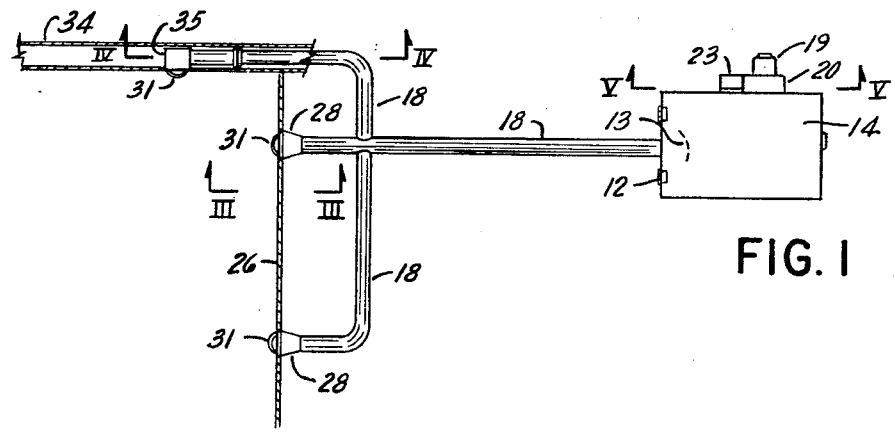
FIGURE 1 is a plan view of one embodiment of the invention, with portions of the automobile in which it is installed shown in cross-section.
Figure 2:
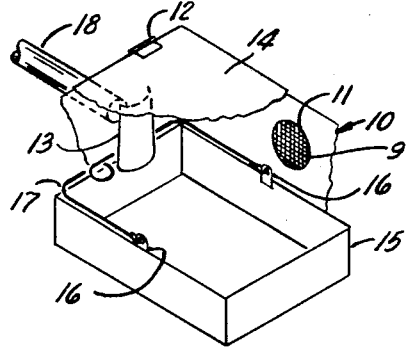
FIGURE 2 is a perspective view, with portions cut away, of the trash disposal unit of the embodiment shown in FIGURE 1.

Referring now to FIGURE 1, an automobile 2 is equipped with a trash disposal and cleaning system which comprises a plurality of trash receiving stations 28, located at various positions in the interior of the automobile, a trash disposal unit 4, a system of tubes 18 connecting the receiving stations 28 with disposal unit 4, a suction fan 20, which exhausts air from unit 4 so as to draw the trash and dirt which enters the receiving units, through tubes 18 and into unit 4. Disposal unit 4 includes a housing 10 and a removable tray 15, located within housing 10. The roof 14 of housing 10 is attached to the body of housing 10 by hinges 12 and may be swung open to provide access to the interior of the receiving unit. A baffle 13 is mounted upon the underside of roof 14. Tray 15 has a handle 17, attached to the tray by ears 16, and when tray 15 is placed inside housing 10, handle 17 is swung to the horizontal position shown in FIGURE 2. In this position the handle projects slightly beyond the end of tray 15, resting snugly against the end wall of housing 10. This prevents the tray from rattling or moving about inside the housing.

A stream of air is drawn through housing 10 by a blower or suction fan 20 mounted upon the side wall of housing 10. A circular opening 11 in housing 10, covered by a safety screen 9, permits air to be drawn from the interior of the housing and into the suction opening 22 of the fan. Fan rotor 21, driven by an electric motor 19, draws the air in through opening 22 and discharges it through an exhaust opening 5. Opening 5 is covered by a discharge door 23 which is held closed by gravity when the fan is not in operation. When the fan is in operation, the current of air causes the discharge door to swing open, pivoting on hinge 24. However, when the fan is not in operation, discharge door 23 remains closed so as to prevent an undesirable backflow of air through the system.

The tubes 18 of the system which carries the trash from receiving stations 28 to the disposal unit 4 and which terminates in a single opening in an end wall of housing 10, have smooth interiors to facilitate the passage of trash through them. The system includes a number of similar branches which are not shown, each having a receiving station.

Figure 3:
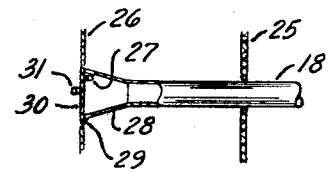
FIGURE 3 is a side elevation along the line III—III in FIGURE 1 of one trash receiving station, with a portion in cross-section.
Figure 5:
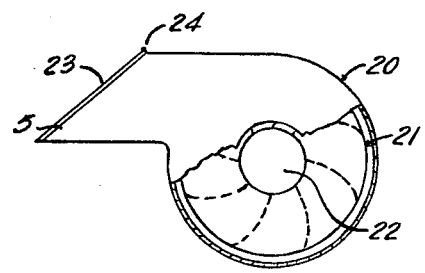
FIGURE 5 is a view of the suction fan taken along line V—V of FIGURE 1, with a portion of the fan housing cut away.
Figure 7:

The receiving station 28 shown in FIGURE 3 is located in the dashboard 26 of the automobile. The end of tube 18 flares to form a chamber into which trash may be placed or into which the end of a flexible vacuum cleaner hose may be inserted, as shown in FIGURE 7 and hereinafter described. Receiving station 28 has a small door 30, which is normally held in a closed position by a spring hinge 29, located along its lower edge. A handle 31, attached to door 30, is used to pull the door open. Located behind the top edge of the door is a switch 27, which is normally held in open position by the pressure of the door against it. The opening of the door closes the switch. Switch 27 is connected in series with motor 19, and it is in parallel with the other switches 27, similarly located in the other receiving station 28. Thus, motor 19 runs at any time that any of doors 30 is open.

Figure 4:
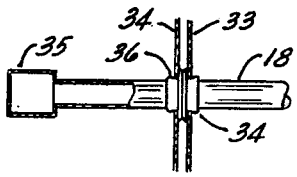
FIGURE 4 is a front elevation along the line IV—IV in FIGURE 1 of a trash receiving station located in one of the doors of the vehicle, with a portion in cross-section.
Figure 6:
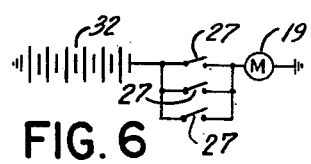
FIGURE 6 is a schematic drawing of the electrical circuit of the embodiment of the invention shown in FIGURE 1; and, FIGURE 7 is an elevation of a hose attachment.

FIGURE 4 shows the structure of the connection that is made in tube 18 for a receiving station 28 that is located in one of the doors 34 of the automobile. The receiving station in FIGURE 4 terminates in an enlarged chamber 35 that is slightly different in design, but substantially the same in function and operation as the one shown in FIGURE 3. Tube 18 has two sections with ends which abut where the tube passes from the car body 33 to the adjacent position of the door 34. When door 34 is closed, the ends of the two sections of tube 18 meet one another so that a single continuous tube is formed.

The operation of the litter evacuator is as follows: A passenger grasps handle 31, opens door 30 and inserts a piece of trash in a receiving station 28. The opening of door 30 closes a switch 27, starting motor 19, which drives suction fan 21. The fan draws a stream of air past the open door 30, into tube 18 and the disposal unit 4. This stream of air carries the piece of litter with it into disposal unit 4. As the air enters housing 10, it impinges against baffle 13, and, since it is then in the large housing it moves much more slowly, and the air no longer carries the litter with it. Hence, the litter drops into tray 15 where it remains until the tray is emptied. Baffle 13 also has the effect of causing the litter to be distributed evenly throughout tray 15, rather than piling up at the end near the outlet of tube 18. The air leaving housing 10 through opening 11 is free of litter, so that no litter is exhausted from the fan through outlet 5.

Access for emptying tray 15 is gained by swinging roof 14 open. It will be noted that since baffle 13 is attached to roof 14, it does not obstruct the removal of tray 15.

FIGURE 7 shows a flexible tube 37 one end 39 of which may be inserted into one of receiving stations 28, and the other end of which has a cleaning attachment 38 for cleaning the automobile interior. The use of this device is similar to that of an ordinary vacuum cleaner, and the dirt removed by it is deposited in tray 15 in the same manner as trash and litter which is placed in one of the receiving stations.

What is claimed is:

1. A refuse collector system for vehicles having a passenger compartment comprising, in combination, a refuse collecting container having an open top and imperforate bottom and adjacent side walls, a removable tray positioned in the bottom of said container having side walls of a height less than the height of the side walls of said container, said tray defining a refuse collecting zone, a closeable lid on said container above said separating zone operable to close said container, an air inlet and an air outlet opening in said container side walls above said tray side walls forming with said container a refuse separating zone above said collecting zone to which refuse may be carried by a stream of air, conduit means having an intake station to receive air and refuse which is accessible from the interior of said passenger compartment, said conduit means providing a continuous passageway from said inlet station to said air inlet opening, blower means operatively connected to withdraw air from said separating zone through said air outlet opening to produce a partial vacuum condition within said separating zone whereby air carrying refuse may be drawn from said inlet station along said passageway and through said air inlet opening to said separating zone, a baffle fixed to said lid and positioned such that when said lid is opened said tray is removable from said container without interference from said baffle and when said lid is closed said baffle being disposed adjacent said air inlet opening to deflect the incoming air and refuse and to prevent air flowing from said air inlet opening to said air outlet opening at a rate sufficient to hold refuse in suspension, whereby refuse entering said separating zone falls onto said tray in said collecting zone and whereby air which is free of items of refuse in withdrawn from said air outlet opening by said blower.

2. The combination described in claim 1 wherein said conduit means comprises a plurality of conduits extending respectively to a number of different locations and each providing an air flow path, and a plurality of closure means which normally close the air inlet end of each of said conduits and which may be opened individually to dispose refuse and to permit the flow of air to move the refuse from said compartment means.

3. Apparatus as described in claim 2 which includes an electric motor driving said blower means, and an electrical control circuit for said electric motor which includes a plurality of switches positioned respectively to be closed by the opening of said closure means.

4. The combination described in claim 1 which includes a removable flexible tubing which may be connected to said conduit means and has a cleaning attachment upon its remote end.

5. Apparatus as described in claim 1 wherein said vehicle is an automobile having a hood, and said refuse collecting container and the associated walls are positioned beneath said hood, and wherein said wall means includes a top wall which may be lifted to remove said refuse collecting container.

6. Apparatus as described in claim 1 wherein said blower means is a blower mounted upon said wall means which has an air discharge passageway, and a hinged cover for said passageway which is gravity urged toward its closed position and which is opened by the pressure of air discharged by said blower.

References Cited

UNITED STATES PATENTS

| | | |
|---|---|---|
| 1,316,442 | 9/1919 | Goughnour. |
| 2,851,156 | 9/1958 | Thompson. |
| 3,062,363 | 11/1962 | Elswood. |
| 3,230,567 | 1/1966 | Nickless. |
| 3,250,382 | 5/1966 | Beil et al. |

ROBERT W. MICHELL, Primary Examiner